United States Patent [19]
Arata

[11] Patent Number: 5,552,605
[45] Date of Patent: Sep. 3, 1996

[54] MOTION CORRECTION BASED ON REPROJECTION DATA

[75] Inventor: Louis K. Arata, Mentor, Ohio

[73] Assignee: Picker International, Inc., Highland Heights, Ohio

[21] Appl. No.: 342,122

[22] Filed: Nov. 18, 1994

[51] Int. Cl.⁶ .......................... G01T 1/161; G01T 1/163
[52] U.S. Cl. .................. 250/363.04; 250/363.07; 250/369; 378/901
[58] Field of Search ...................... 250/363.04, 369, 250/363.07, 363.09; 378/11, 15, 901

[56] References Cited

U.S. PATENT DOCUMENTS

| | | |
|---|---|---|
| 4,858,128 | 8/1989 | Nowak . |
| 5,173,608 | 12/1992 | Motomura et al. . |
| 5,210,421 | 5/1993 | Gullberg et al. ............... 250/363.04 |
| 5,287,276 | 2/1994 | Crawford et al. ............... 364/413.19 |
| 5,337,231 | 8/1994 | Nowak et al. . |

FOREIGN PATENT DOCUMENTS 63-177092   7/1988   Japan ................. 250/363.04

*Primary Examiner*—Carolyn E. Fields
*Assistant Examiner*—Edward J. Glick
*Attorney, Agent, or Firm*—Fay, Sharpe, Beall, Fagan, Minnich & McKee

[57] ABSTRACT

A SPECT camera system has detector heads (14a, 14b, 14c) each having a collimator (18) facing toward an examination region (10). The detectors receive emission radiation from a radioisotope injected into a subject in the examination region and, preferably, also receive transmission radiation from a transmission source (20) disposed across the examination region. The detectors rotate around the subject through a plurality of projection angles. The detectors generate projection views from the received radiation for each projection angle. The projection views are stored in a projection view memory (26). A reconstruction processor (38) reconstructs the projection views into a volumetric image representation that is stored in a volumetric image memory (40). A reprojector (42) reprojects the volumetric image and volume of interest along each projection angle producing a set of reprojection views and regions of interest. A view comparator (50) compares each corresponding projection and reprojected view within the region of interest along a common projection direction. A translator (52) translates or offsets each projection view in accordance with the comparison to produce a corrected or shifted projection view. The corrected projection views are then reconstructed to produce a motion corrected volumetric image representation. This procedure may be iterated to optimize the motion correction.

17 Claims, 2 Drawing Sheets

5,552,605

MOTION CORRECTION BASED ON REPROJECTION DATA

BACKGROUND OF THE INVENTION

The present invention relates to the art of diagnostic imaging. The present invention finds particular application in conjunction with nuclear or gamma cameras and will be described with particular reference thereto. The present invention will also find application in other imaging systems such as digital x-ray computed tomography.

In single photon emission computed tomography (SPECT), a radioisotope is injected into the body of a patient. The radioisotope preferably travels to an organ of interest whose image is to be produced. The patient is placed in an examination region of the SPECT system surrounded by large area planar radiation detectors. Radiation emitted from the patient is detected by the radiation detectors. The detectors have a collimator to limit the detector to seeing radiation from a selected trajectory, e.g., normal to its plane. A transmission radiation source is disposed across the patient 180° from one of the detectors. The emission and transmission radiation sources have sufficiently different energies that they are readily differentiated.

Typically, the detector includes a scintillation crystal that is viewed by an array of photomultiplier tubes. The relative outputs of the photomultiplier tubes are processed and corrected, as is conventional in the art, to generate an output signal indicative of (1) an (i,j) coordinate on the detector head at which each radiation event is received, and (2) an energy of each event. The energy is used to differentiate between emission and transmission radiation and between multiple emission radiation sources. A two-dimensional projection image representation is defined by the number of radiation events received at each coordinate.

In tomographic imaging, the detector is rotated in equal increments or in a continuous orbit around the patient. Each projection image is digitized as a two-dimensional array of pixel values or views. These views collected from the multiplicity of projection angles are reconstructed to produce voxel values of a three-dimensional or volumetric image representation. Often, the volumetric image is treated as a series of slice images with each slice being perpendicular to an axis of rotation.

In order to minimize the radiation dosage to which the patient is exposed, the injected radioisotope is of relatively low radioactivity. As a consequence, each view requires a significant amount of time such as, for example, about 40 seconds, to produce. If a total of 64 views on a 360° arc is desired, angularly spaced by about 5.6°, then the entire imaging process typically takes about 40 minutes to complete. Blurring or distortion of the resultant image can take place when the body or organs within the body move. Typically, each voxel is about one-half centimeter cubed. Keeping a human body still to within one-half centimeter for 40 minutes is difficult, if not impossible. Thus, body motion and resultant image degradation are common problems.

SUMMARY OF THE INVENTION

In accordance with the present invention, a new and improved method and apparatus for correcting image distortions caused by motion occurring during a SPECT or nuclear camera scan is provided. A radiation detector is rotated in an orbit around a patient at incremental projection angles or in a continuous orbit. The radiation detector produces electrical data indicative of received radiation from an examination region. At each projection angle, the electrical data forms a two-dimensional projection view of a region of interest within the patient. A reconstruction processor reconstructs the multiple projection views into a three-dimensional reconstructed image representation of the region of interest. A reprojection circuit reprojects the reconstructed image representation at each of the original projection angles to produce a set of reprojection views. A view comparator compares each projection view within a region of interest with a corresponding reprojection view produced at the same projection angle. An i,j-offset between these two views is determined and the projection view is translated by this offset to produce a corrected projection view. The corrected projection views are reconstructed into a corrected three-dimensional reconstructed image representation.

In accordance with a more limited aspect of the present invention, the reconstruction processor includes a filter which filters the projection views to smooth the data, reduce noise, and to make edges more apparent.

In accordance with a more limited aspect of the present invention, the reprojection circuit includes an isolator and an image enlarger for isolating and enlarging the volume of interest (VOI) within the reconstructed image before it is reprojected. This volume of interest is reprojected to produce a region of interest (ROI) for each view.

One advantage of the present invention is that motion occurring during a scan, (e.g., patient, organ, or apparatus motion) is corrected more accurately using the reprojection data producing a clearer image.

Another advantage of the present invention is that correction in the i-axis direction is easily obtained due to the use of reprojection views.

Yet another advantage of the present invention is that automatic identification of the region of interest in each view is easily accomplished using the reprojected volume of interest.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
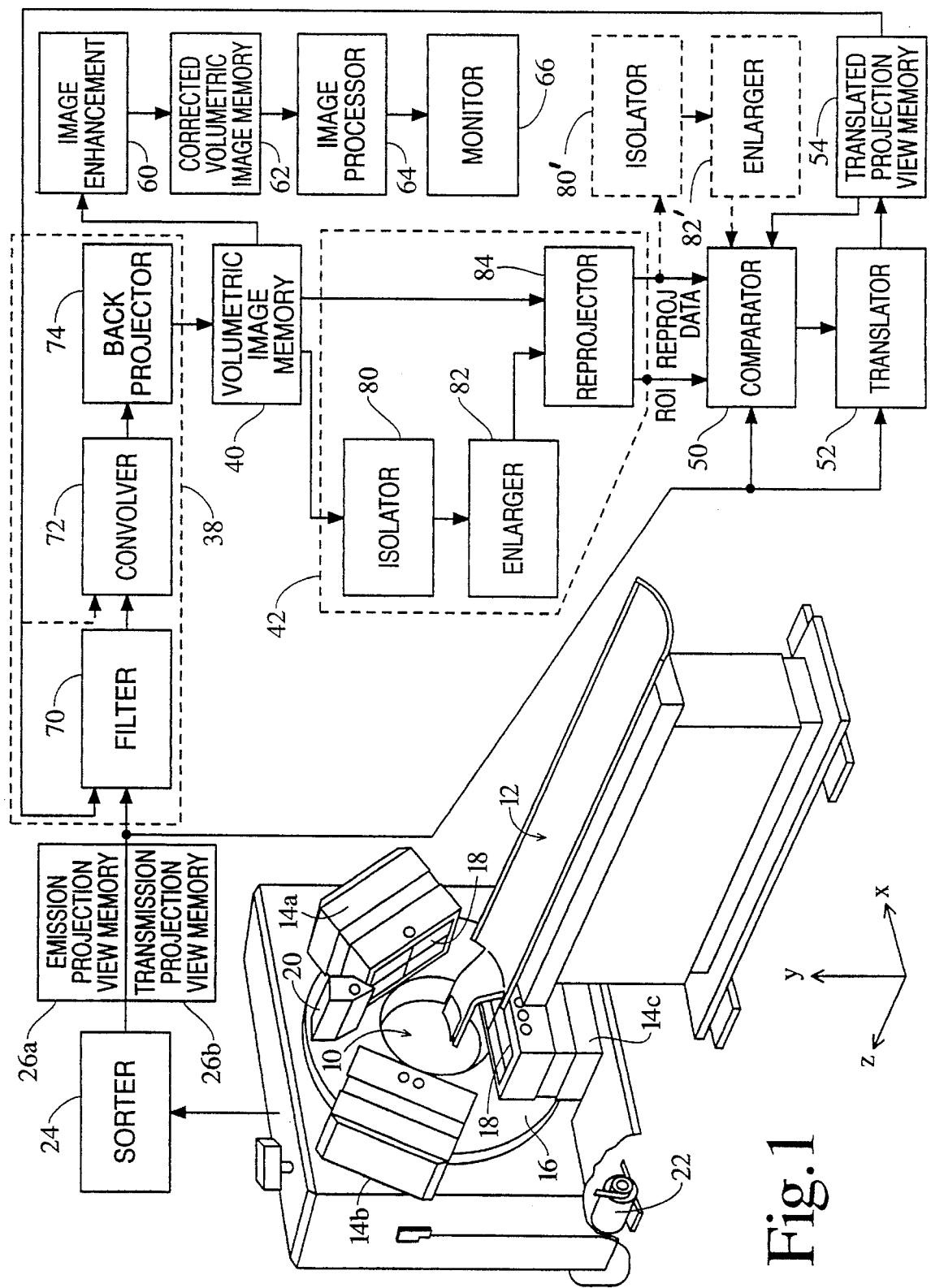
FIG. 1 is a diagrammatic illustration of a SPECT camera in accordance with the present invention; and, FIG. 2 shows a representation of a projected view, its corresponding reprojected view, and the projected view corrected after matching.

With reference to FIG. 1, a SPECT camera system has an examination region 10 for receiving a subject. A subject support or patient couch 12 adjustably positions the subject in the examination region 10. The examination region is surrounded by three detector heads 14a, 14b, and 14c mounted on a gantry 16. It is to be appreciated that a fewer or greater number of detectors can be provided. Each of the detectors have a collimator 18 disposed toward the examination region 10 in back of which lies a scintillation crystal and an array of photomultiplier tubes. Radiation emanating from radiopharmaceuticals injected into the subject follows paths through the collimators 18 to the detector heads 14a, 14b, and 14c.

A transmission/radiation source 20 is disposed across the examination region from at least one of the detector heads. The transmission radiation source emits radiation of a different energy than the injected radiopharmaceutical or emission radiation source. As radiation is received by each detector, electronic circuitry associated with the photomultiplier tubes produce electrical data indicative of the (i,j) coordinate location and the energy of each received radiation.

The gantry includes a plurality of motor drives 22 which are operated individually or in combination in order to move the detector heads radially and circumferentially to follow selectable orbits around the subject. The detector heads are rotated in incremental angles or continuously through the selected orbit. At each angle, projection data is collected indicative of the received radiation. A sorting device 24 sorts the projection data into transmission projection views and emission projection views. The transmission and emission projection views are stored in projection view data memory 26 which includes an emission projection data memory portion 26a for storing emission projection views and a transmission projection data memory portion 26b for storing transmission projection views. During the scanning process, a plurality of projection views are collected (e.g. 60, 120) throughout the selected orbit.

Figure 2:
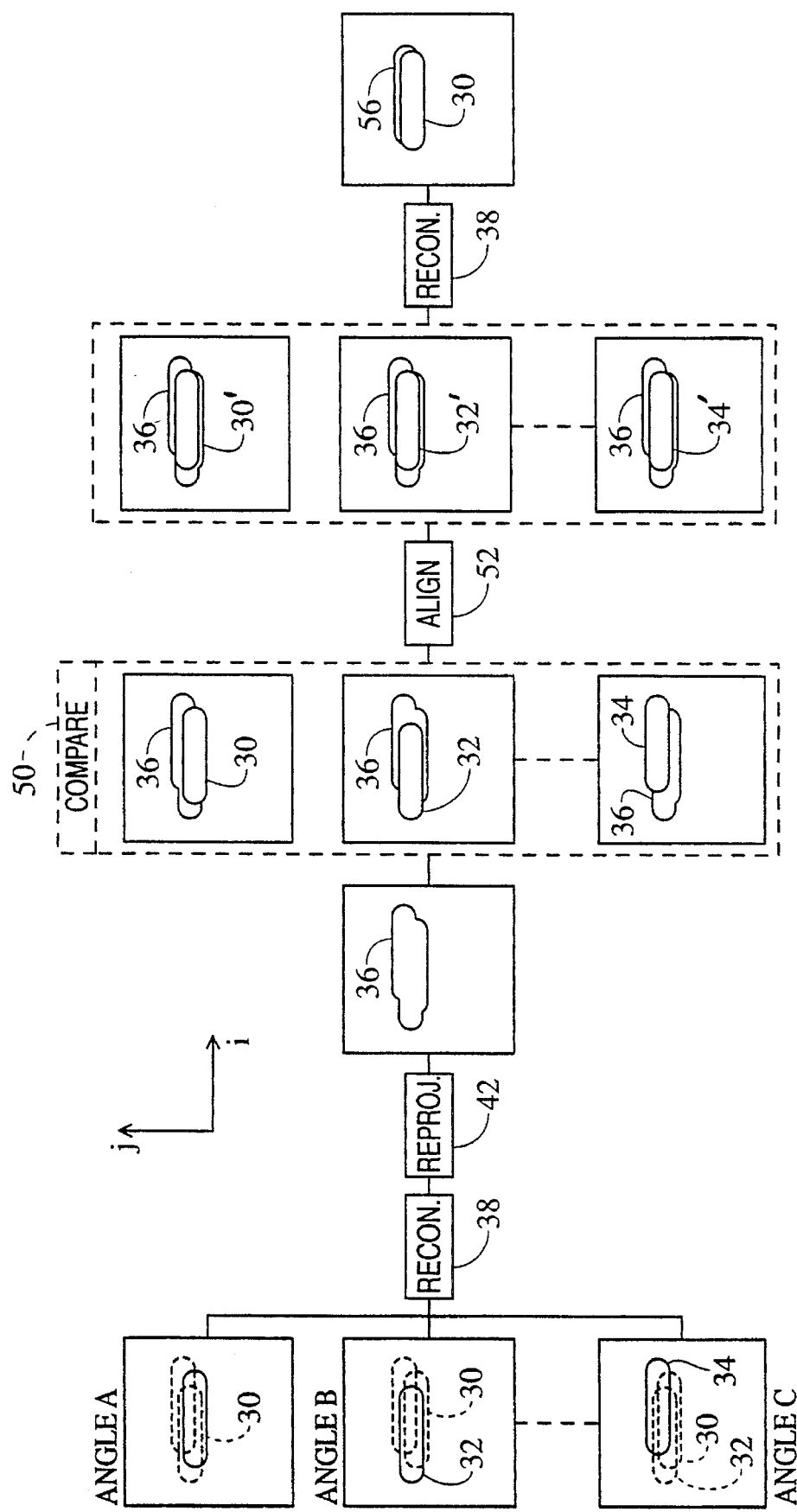

With reference to FIG. 2, any motion caused by patient or organ movement will shift the projection view. A projection view of an organ of interest is defined by an outline 30. Motion translates the organ projection to other locations as shown for example by projection views 32 and 34. The projection views are collected over time. Reconstructing the shifted views integrates the views into an apparently larger and blurred organ, a projection of which is shown in an enlarged region 36.

Referring again to FIG. 1, the projection data, either transmission or emission from the plurality of projection angles is reconstructed by reconstruction processor 38 into a volumetric image representation stored in a volumetric image memory 40. The organ of interest is blurred and enlarged in the volumetric reconstruction image representation. Moreover, at some angles, there is different motion than at other views. Accordingly, the volumetric image representation tends to be more blurred and enlarged than the individual projection views. The volumetric image representation is reprojected by reprojection circuit 42 into reprojected views at the original projection angles. A distance weighting function corrects for attenuation. This produces a set of reprojection model views of the organ of interest. A set of reprojected regions of interest is also produced. Reprojection 36 of FIG. 2 is typical. The reprojection models are stationary in spite of the patient or organ motion, but may be blurry due to motion which occurred during the scanning process.

Each view of the reprojection models is matched and compared within the region of interest by a comparator 50 to each corresponding original projection view taken at the same projection angle. If the original projection data were not affected by motion, the view of the original projection data would match very closely the view from the reprojection model for each i,j-coordinate at each projection angle. However, if motion occurred, the region of interest in the compared views will align most closely at a particular i,j-offset.

In particular, the cross-correlation (within the region of interest) of each reprojection model with the original projection data is computed for a given projection angle. A fractional position of an optimal maximum cross-correlation is estimated by parabolic interpolation of the maximum index and its two neighbors. Interpolation is performed separately in the i and j-directions. The data of the original projection view is translated in the i and the j-directions based on the maximum cross-correlation point. Various other comparing techniques are also contemplated. For example, the centroids of the original projection views and the reprojection view at each angle can be compared. Another example is to compute an average of the absolute difference at various i,j-offsets using edge images. A translator 52 translates each original emission and transmission projection view from the projection memory 26 by the offset corresponding to the projection producing a motion corrected projection view that is stored in a translated projection view memory 54.

With reference to FIG. 2, the translator 52 shifts each of the original projection views 30, 32, and 34 by i and j offset values found during the comparison with the reprojection views 36 at each angle. After translation, the translated projection views 30', 32', 34' are more nearly aligned. These comparison and translation steps are iterated until the incremental offsets fall below a preselected value. The offsets corresponding to the highest correlation measure is chosen.

The reconstruction processor 38 separately reconstructs the translated transmission and emission projection data into volumetric transmission and emission volumetric images which are stored in the volumetric image memory 40. The reprojector 42, in one embodiment, reprojects the volumetric transmission (or emission) image data into a second set of reprojection views 56. The comparator 50 compares the reprojected views 56 with the once translated views 30', 32', and 34'. If the deviation exceeds a predetermined error, the translator 52 adjusts the translation of each original view by the cumulative offset. The process is iterated until the reprojected and translated projections match within preselected tolerances.

Once the projection data has been translated to within the preselected tolerances, an image enhancement processor 60 combines the volumetric transmission and emission image data, as is known in the art, to generate an attenuation corrected emission image, composite emission/transmission image, or the like for storage in a corrected volumetric image memory 62. A video processor 64 selects slice images, projection images, perspective images, or the like for display on a video monitor 66. Film printers and other devices for converting the electronic image data to a human-readable form are also contemplated. Of course, the projection views, volumetric image, translated projection view and corrected volumetric image memories can all be part of a common mass memory.

Looking to the embodiment of FIG. 1, in the preferred embodiment, the reconstruction processor 38 includes a filter 70, a convolver 72 which convolves the smoothed views with a convolution kernel, and a backprojector 74 which backprojects the convolved views into the volumetric image memory 40. The filter 70 (i) smooths the views to reduce noise and (ii) slightly edge enhances the views to emphasize edges. In the preferred embodiment, a bandpass filter is applied to the projection data.

The reprojection circuit 42 includes an isolator 80 and an image enlarger 82. The isolator 80 isolates the organ of interest in the three-dimensional image representation stored in the volumetric image memory 62. For example, the operator selects a slice through the volume to locate and identify the organ of interest. When a point on the organ of interest is identified, its image value is compared to the image values of contiguous voxels. Contiguous voxels whose values are below a preselected threshold are assumed to be part of the organ. Voxels adjoining other voxels of the selected organ are compared analogously. In this manner, a volume corresponding to the selected organ is "grown". The operator can also view reconstructed images and edit the volume of interest manually. The enlarger 82 enlarges the grown volume of interest preferably by applying a three-dimensional dilation operation twice using a 3×3×3 kernel. The enlarged volume data, which represents the isolated organ of interest, is reprojected by a reprojection processor 84 to form regions of interest for each view. Alternately, an isolator 80' and an enlarger 82' can be connected with an output of the projection processor to isolate and enlarge the region of interest on a reprojected view by reprojected view basis.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An imaging system comprising:
    a radiation detector for receiving radiation from an examination region sequentially at a plurality of projection angles, the radiation detector producing electrical data indicative of the coordinate locations on the detector at which radiation is received, the electrical data at each of the projection angles forming a projection view of the examination region;
    a reconstruction processor for reconstructing a volumetric image representation from the projection views;
    a reprojection processor for reprojecting the reconstructed volumetric image representation to produce a reprojection view along each of the plurality of projection angles;
    an image isolator for isolating a subvolume of interest in the reconstructed volumetric image representation;
    a view comparator for comparing the projection view with the reprojection view at each of the projection angles to determine an offset; and
    a translator for translating each projection view by the corresponding offset, the translator being connected with the reconstruction processor to reconstruct the translated projection views into a corrected volumetric image representation.

2. The imaging system as set forth in claim 1 further including a filter for smoothing and reducing noise in each of the projection views.

3. The imaging system as set forth in claim 2 wherein the filter is a bandpass filter.

4. The imaging system as set forth in claim 1 wherein the reprojection processor further includes an image enlarger for enlarging the isolated subvolume of interest, whereby the reprojector reprojects the volume of interest to define a region of interest.

5. The imaging system as set forth in claim 1 wherein a radioisotope is injected into a subject in the examination region and further including:

a transmission radiation source disposed across the examination region from the detector, such that the detector receives transmission and emission radiation and generates transmission and emission radiation projection views at each of the plurality of projection angles; and
    a projection view memory for storing the transmission and emission projection views, the projection view memory being connected with the reconstruction processor for supplying at least one of the transmission and emission radiation projection views thereto.

6. The imaging system as set forth in claim 5 wherein the projection view memory is connected with the translator for supplying the transmission and emission projection views thereto for translation and further including:
    a translated projection view memory connected with the transmission and emission projection views, the translated projection view memory being connected to the reconstruction processor for supplying the translated transmission and emission projection views thereto for reconstruction into volumetric transmission and emission image representations.

7. The imaging system as set forth in claim 6 further including:
    a volumetric image memory connected with the reconstruction processor for storing the volumetric transmission and emission image representations;
    a monitor connected with the volumetric image memory for converting selective portions of the volumetric image representation into a human-readable display.

8. The imaging system as set forth in claim 7 further including:
    a volumetric image combiner for combining the transmission and emission volumetric image representations.

9. The imaging system as set forth in claim 1 wherein a subject disposed in the examination region is injected with a radioisotope and further including:
    a volumetric image memory connected between the reconstruction processor and the reprojection processor, a projection view memory for storing the projection views, the translator being connected with the projection view memory for translating the projection views therefrom and with the reconstruction processor to supply the translated projection views thereto such that the reconstruction processor reconstructs the translated projection views into a corrected volumetric image representation for storage in the volumetric image memory; and
    a monitor for selectively converting portions of the corrected volumetric image representation into a human-readable display.

10. An imaging system comprising:
    a radiation detector which receives radiation from an examination region sequentially at a plurality of projection angles, the electrical data at each of the projection angles forming a projection view of the examination region;
    a reconstruction processor which reconstructs a volumetric image representation from the projection views;
    a reprojector that reprojects the reconstructed volumetric image representation along each of the plurality of projection angles to produce a reprojection view;
    an isolator which isolates a region of interest in each reprojected view;
    a view comparator which compares a portion of the projection view corresponding to the region of interest with the reprojection view at each of the projection angles to determine an offset; and, a translator which translates each projection view by the corresponding offset, the translator being connected with the reconstruction processor to reconstruct the translated projection views into a corrected volumetric image representation.

11. The imaging system as set forth in claim 10 further including:

an image enlarger which enlarges the region of interest in each reprojected view.

12. A method for correcting for motion during diagnostic imaging comprising:

(a) collecting a plurality of projection views of a region of interest, each of the projection views being collected at a corresponding projection angle;.

(b) reconstructing a volumetric image representation from the projection views;

(c) isolating a volume of interest within the reconstructed volumetric image representation;

(d) at each of the projection angles, reprojecting the volume of interest to form a reprojection view of the region of interest;

(e) at each projection angle, comparing the corresponding projection and reprojection view;

(f) shifting each projection view in accordance with the comparing step to produce a shifted projection view; and.

(g) reconstructing the shifted projection views into a corrected volumetric image representation.

13. The method as set forth in claim 12 further including:

projecting the corrected volumetric image representation to generate second reprojection views;

comparing corresponding second reprojection views and shifted projection views;

further shifting the projection views in accordance with the comparison;

reconstructing the further shifted reprojection views into a twice corrected image representation.

14. The method as set forth in claim 12 wherein the shifting includes shifting the projection images relative to a horizontal direction.

15. The method as set forth in claim 12 wherein the shifting includes shifting the projection images in a vertical direction.

16. A method for correcting for motion during diagnostic imaging comprising:

(a) collecting a plurality of projection views of a region of interest, each of the projection views being collected at a corresponding projection angle;

(b) reconstructing a volumetric image representation from the projection views;

(c) at each of the corresponding projection angles, reprojecting a reprojection view from the volumetric image representation;

(d) computing a maximum cross-correlation between projection and reprojection views corresponding to a common projection angle;

(e) parabolicly interpolating in a first direction orthogonal to a central axis to obtain an i-direction offset at the maximum cross-correlation;

(f) parabolicly interpolating in a second direction perpendicular to the first direction to obtain a j-direction offset at the maximum cross-correlation;

(g) shifting each projection view by a cumulative i-direction and cumulative j-direction offset to produce shifted projection views; and (h) reconstructing the shifted projection views into a corrected volumetric image representation.

17. In a method of diagnostic imaging in which radiation from an examination region is collected to define projection views at each of a plurality of projection directions around the examination region and the projection views are reconstructed into an image representation, the improvement comprising:

isolating a region of interest in the image representation;

reprojecting the region of interest of the image representation along the projection directions to generate corresponding reprojection views;

comparing corresponding projection and reprojection views along each projection direction to determine a variance therebetween;

translating each projection view in accordance with the corresponding variance; and, reconstructing the translated projection views into a motion corrected image representation.

* * * * *